US005934117A

United States Patent [19]

Shen

[11] Patent Number: 5,934,117

[45] Date of Patent: Aug. 10, 1999

[54] LOCK WITH A CLUTCHING OUTER HANDLE

[76] Inventor: Mu-Lin Shen, No. 32, Lane 76, Sec. 5, Fu-an Rd., Tainan, Taiwan

[21] Appl. No.: 08/937,659

[22] Filed: Sep. 24, 1997

[51] Int. Cl.[6] .............................. B60R 25/02

[52] U.S. Cl. .............................. 70/224; 70/472; 70/149; 70/218; 70/223

[58] Field of Search .............................. 70/472, 149, 218, 70/221, 222, 223, 224, 422, 386

[56] References Cited

U.S. PATENT DOCUMENTS

| | | | |
|---|---|---|---|
| 1,714,286 | 5/1929 | Waldo | 70/149 |
| 1,919,750 | 7/1933 | Rymer | 70/149 |
| 2,207,143 | 7/1940 | Brauning | 292/337 |
| 2,511,522 | 6/1950 | Williams | 70/221 |
| 3,024,055 | 3/1962 | Novarino | 292/169 |
| 4,631,944 | 12/1986 | Gater et al. | 70/472 |
| 5,040,652 | 8/1991 | Fish et al. | 192/56 R |
| 5,295,376 | 3/1994 | Myers | 70/369 |
| 5,577,409 | 11/1996 | Oyabu et al. | 70/379 |
| 5,651,280 | 7/1997 | Park | 70/472 |
| 5,730,014 | 3/1998 | Berger et al. | 70/422 |

*Primary Examiner*—Darnell M. Boucher
*Assistant Examiner*—Clifford B Vaterlaus
*Attorney, Agent, or Firm*—Foley & Lardner

[57] ABSTRACT

A freewheeling clutching design for enabling a freewheeling movement of an outer door handle with respect to a latch assembly of a lock when the lock is in a locked state. A clutch column is axially movable to engage with or disengage from a latch assembly by way of turning a control member which simultaneously moves axially. The outer door-handle performs a normal operation of opening a door when the clutch column engages the latch assembly, while it performs the freewheel turning movement to prevent an undesirable transfer of force to internal components of the lock when the clutch column engages the latch assembly.

4 Claims, 5 Drawing Sheets

LOCK WITH A CLUTCHING OUTER HANDLE

BACKGROUND OF THE INVENTION

The present invention relates to a lock in which when in a locked position its outer handle can still be rotated or be freewheeling so that a normal rotational movement applied to the outer handle will not be undesirably transferred to internal components of the lock.

Door locks generally have a push button disposed at an inner side of the door and used to operate a control rod so as to block an outer door handle from a rotational movement to open the door. To unlock the outer door handle from an outer side of a door when the push button is in effect, a key is simply required to operate the control rod to release the locking condition of the outer door handle. This is the situation when a user knows in advance that the door is locked and therefore he must use a key to unlock the outer door handle. This, however, is not the situation when a user does not have any idea about if the lock is in a locked or unlocked condition.

When a user is to open a door equipped with a lock without knowing in advance that the lock is in a locked condition, a first reaction of the user would be to turn the outer handle or knob, but not to use a key. The key will be used only when the user later finds out that the lock is in a locked condition. Under repeated application of excessive turning force exerted by a user upon the outer handle or knob, loosening of the lock itself or with respect to the door is apt to occur. The present invention thus aims to "allow the possibility of a freewheeling movement of an outer door handle when the lock is in a locked condition."

BRIEF SUMMARY OF THE INVENTION

A main object of the present invention is to provide a clutch assembly for enabling a freewheeling movement of an outer door handle with respect to a latch assembly of a lock, comprising: a guiding sleeve mounted in a fixed relationship with respect to the outer door handle; a control member rotatably mounted and axially movably retained to the guiding sleeve; and a clutch column axially movable with the control member for engagement with and disengagement from the latch assembly.

Other objects, advantages and novel features of the invention will become more apparent from the following detailed description when taken in conjunction with the accompanying drawings.

DETAILED DESCRIPTION OF THE INVENTION

Figure 1:
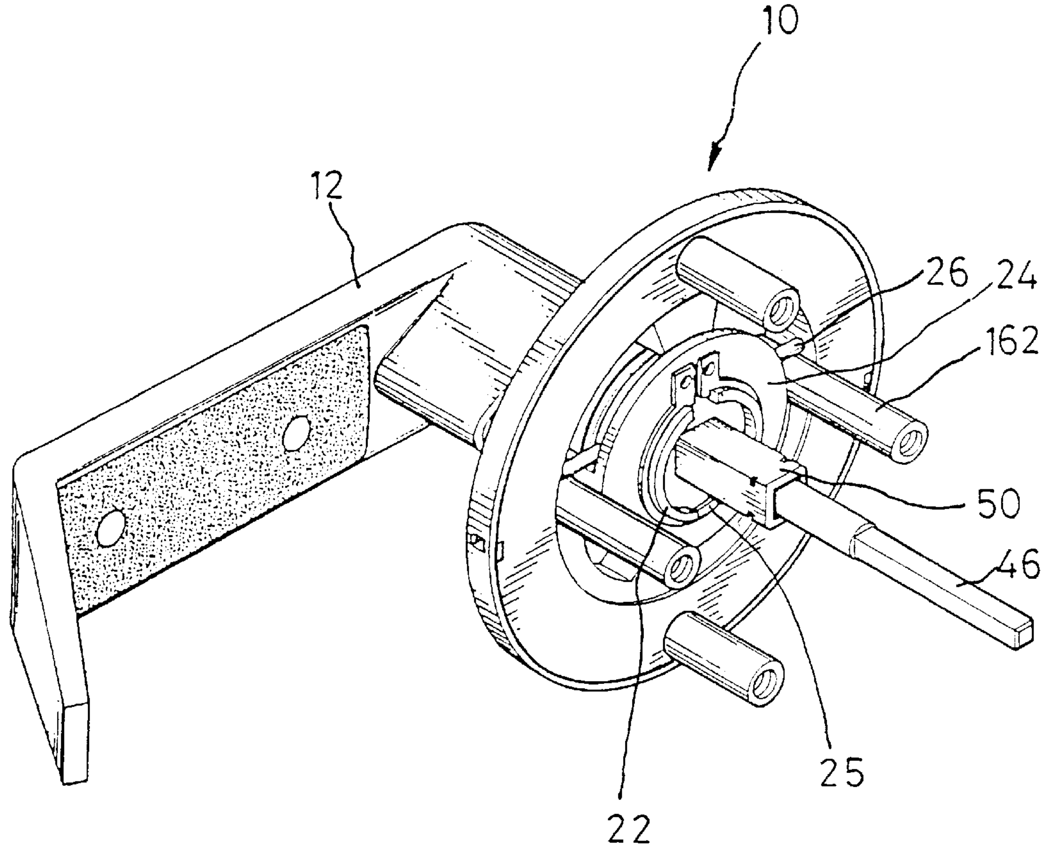
FIG. 1 is a perspective view of a lock sub-assembly which incorporates a clutch assembly in accordance with the present invention.
Figure 2:
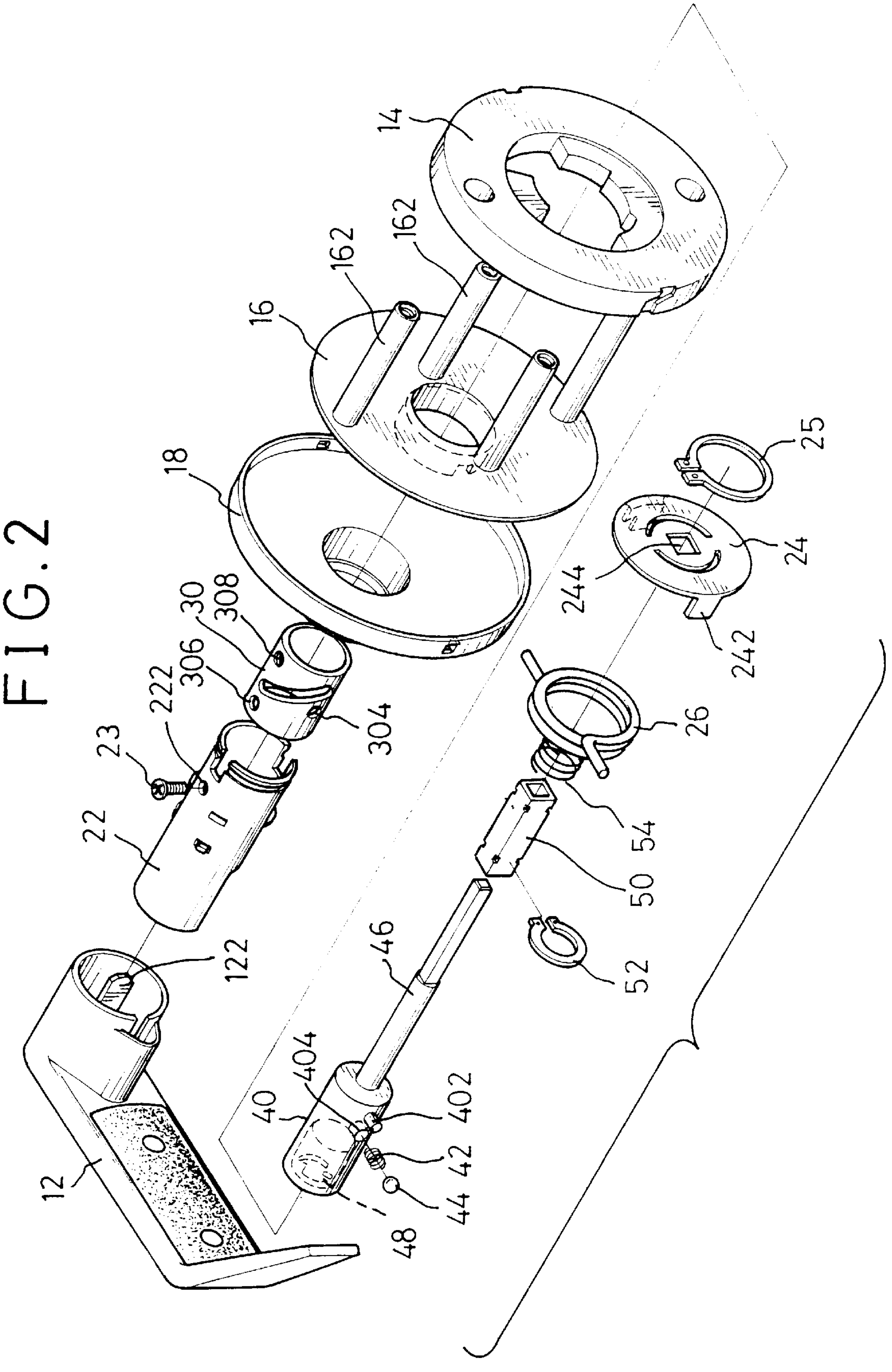
FIG. 2 is an exploded view of the lock sub-assembly shown in FIG. 1.

Referring to the drawing figures and initially to FIGS. 1 and 2, a perspective view and an exploded view of a lock sub-assembly which incorporates a clutch assembly in accordance with the present invention are shown, respectively. The clutch assembly, when applied to a lock in a locked condition, will enable a free rotational or freewheeling movement of an outer door handle 12 with respect to a latch assembly 100 (cf. FIG. 4) of the lock, which will be clear in the following description. The lock as shown comprises a rose liner 14 through which a reinforcing liner 16 having a number of studs 162 passes. The combination of the rose liner 14 and the reinforcing liner 16 is then covered by an outer rose cover 18.

The clutch assembly comprises a guiding sleeve 30 mounted in a fixed relationship with respect to the outer door handle 12. The guiding sleeve 30 has an inclined guide slot 302 and a pair of positioning holes 304 and 306, the positioning hole 304 being defined at a position near an inward terminal end of the slot 302 and the positioning hole 306 being defined at an outward position. An outer spindle 22 may be disposed between the guiding sleeve 30 and the outer door handle 12 and fixedly mounted to the outer door handle 12 in a known manner so that the guiding sleeve 30 may be fixedly connected to the outer spindle 22, for example, by way of a mounting screw 23 extending through screw holes 222 and 308 respectively formed on the outer spindle 22 and the guiding sleeve 30. In this way, a turning movement of the outer door handle 12 will turn both the outer spindle 22 and the guiding sleeve 30. A driving piece 24 is attached to a front portion of the outer spindle 22 and is retained in place by the aid of a C-clip 25. The driving piece 24 has a pair of ears 242 either one of which, when the driving piece 24 is turned together with the outer spindle 22, can act on a corresponding one of two free legs of a torsion spring 26 which, as shown in FIG. 1, is supported on a pair of middle studs 162 of the reinforcing liner 16 and encloses around the outer spindle 22. When a turning force acting on the outer spindle 22 by the outer door handle 12 is removed, the torsion spring 26 will return the driving piece 24 and accordingly the outer spindle 22 back to its rest position such as shown in FIG. 1.

The clutch assembly also comprises a control member 40 which has a stud 402 extending into the inclined guide slot 302 of the guiding sleeve 30 and a depression 404 receiving a combination of a spring 42 and a ball 44. With the stud 402 guided within the slot 302 and the ball 44 and spring 42 combination acted between the depression 404 and either the positioning hole 304 or the positioning hole 306, the control member 40 is rotatably mounted to and axially movably retained by the guiding sleeve. The control member 40 also has an actuating bar 46 which in the embodiment shown is integrally formed at an endface thereof. The actuating bar 46 can be manipulated to move the control member 40 so that the ball 44, under the urging force of the spring 42, engages or is partially received in either the hole 304 or the hole 306. When the ball 44 engages or is partially received in the hole 304, the control member 40 is at an inward position with respect to the guiding sleeve 30, while when the ball 44 engages the hole 306, the control member 40 is at an outward position with respect to the guiding sleeve 30. An operating opening 48 is formed on an outward end of the control member 40 and, like the actuating bar 46, can be manipulated, such as through a key operated blade 122, to move the control member 40 between the inward and the outward positions.

A clutch column 50 of generally rectangular, hollow shape extends through a corresponding rectangular hole 244 of the driving piece 24 and bears against the inward endface of the control member 40. The actuating bar 46 extends through and is freely rotatable within the clutch column 50. Bearing of the clutch column 50 against the control member 40 is achieved, for example, by providing a C-clip 52 attached to the clutch column 50 and a spring 54 compressed between the C-clip 52 and the driving piece 24 to urge the C-clip 52 and therefore the clutch column 50. With this construction, the clutch column 50 is axially movable with the control member 40.

Figure 3:
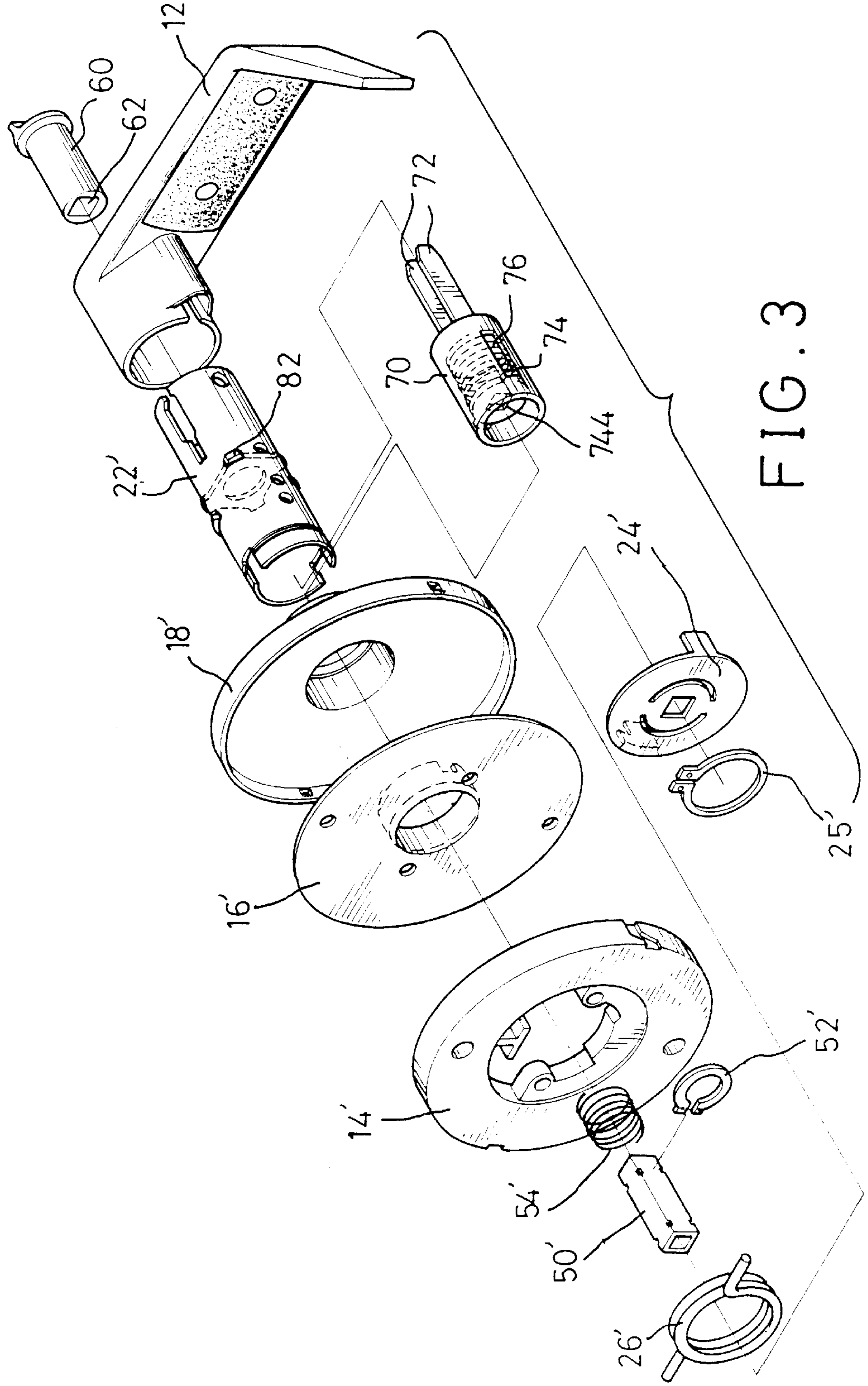
FIG. 3 shows a lock sub-assembly which is to be mounted from an inner side of a door.

FIG. 3 shows a sub-assembly, i.e., the inner door side of a lock, in which similar or identical elements to those of FIG. 2 such as handle 12', rose liner 14', reinforcing liner 16', inner rose cover 18', inner spindle 22', driving piece 24', C-clip 25', torsion spring 26', clutch column 50', C-clip 52', and spring 54' can be seen. Similar or identical functions of these elements will be apparent from the above description and be omitted herein for simplicity. Further shown in this figure are a turn button 60 and a coupler 70 both to be received in the inner spindle 22'. The turn button 60 has a hole 62 and the coupler 70 has tails 72 for inserting into the hole 62 so that the turn button 60 and the coupler 70 can rotate in unison. The inner spindle 22' has a spring-biased keeper 82 for rigid connection to the handle 12' in a generally known manner. The keeper 82 has a central hole (not shown) which is of such a size that the tails 72 of the coupler 70 may extend therethrough but not the rest portion of the coupler 70 nor the turn button 60. Received within the barrel portion of coupler 70 are a disk 74 and a spring 76.

The disk 74 has a rectangular hole 744, of a shape complementary to the rectangular cross-section of the actuating bar 46, so that an end of the actuating bar 46 enters the hole 744. The disk 74 thus can permit an axial movement of the actuating bar 46. Also, a mutual rotational movement is created between the disk 74 (and therefore the coupler 70) and the actuating bar 46.

An operation of the clutch assembly will now be described with reference particularly to FIGS. 4 and 5.

Figure 4:
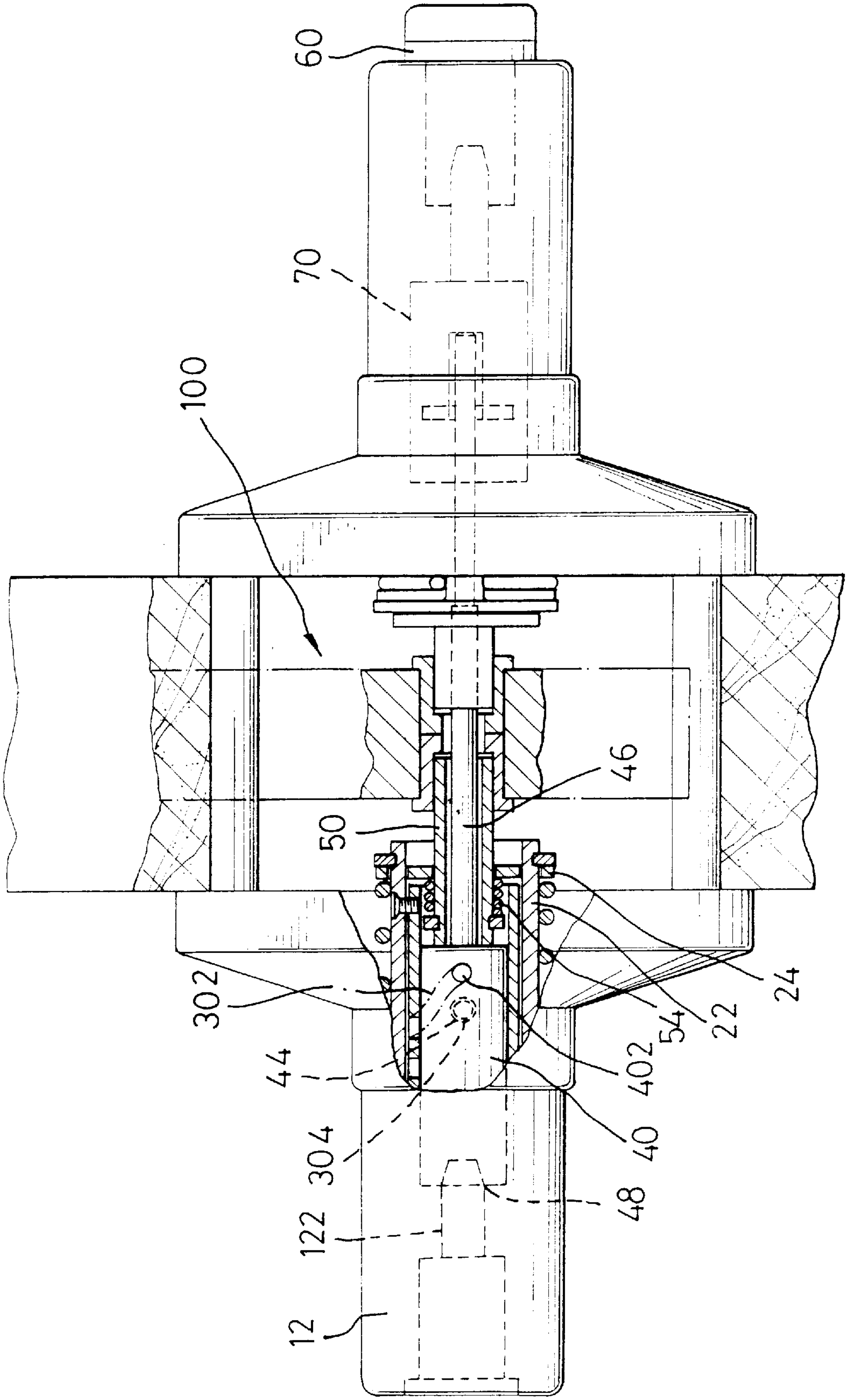
FIG. 4 gives an assembled lock on a door which consists of both sub-assemblies of FIGS. 1 and 3, in which the clutch assembly is shown in an engaged state.
Figure 5:
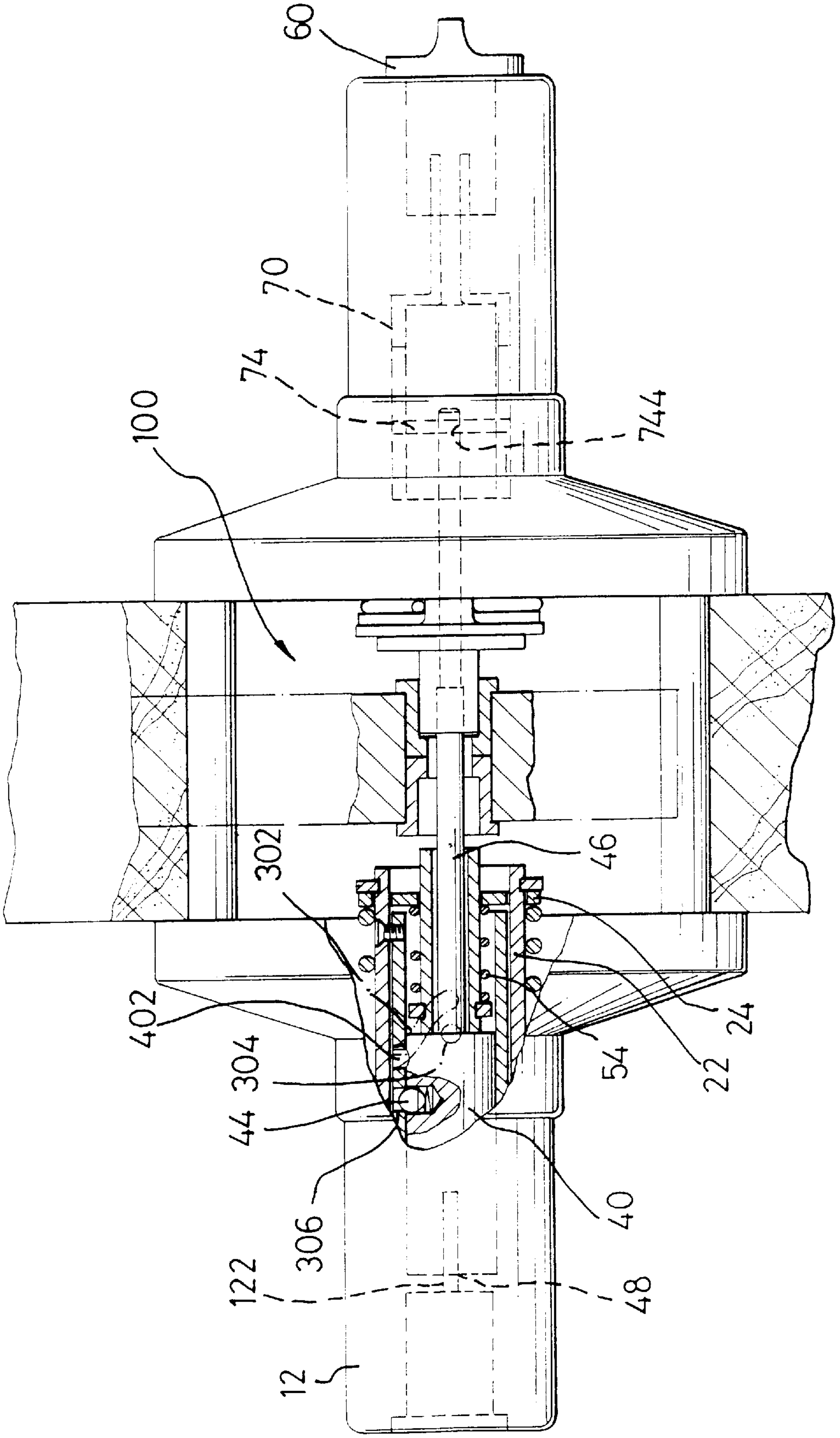
FIG. 5 gives a view similar to FIG. 4 but showing the clutch assembly in a disengaged state.

Initially, the axial position of the control member 40, and therefore both the actuating bar 46 integrally formed with the control member 40 and the clutch column 50 abutting the control member 40 under the action of the spring 54, is determined by the stud 402 within the slot 302 of the guiding sleeve 30 and this position is retained by the ball 44 engaging or being partially received in the hole 304, as shown in FIG. 4. Moreover, in FIG. 4, the clutch column 50 is at the inward position so that it engages with the latch assembly 100. As can be understood, this is the state in which the outer handle 12 can be manipulated to turn the outer spindle 22, the driving piece 24, and the clutch column 50 to open a door.

To establish a state that a door is locked while the outer handle 12 can turn freely or freewheel, a user can perform either of two operations. One is to turn the control member 40 by manipulating the operating opening 48 thereof through the key-operated blade 122. This turning movement of the control member 40 will cause the stud 402 to move along the slot 302 while the ball 44 disengages or moves from the hole 304 to engage or be partially received in the other hole 306. This results in an axial movement of the control member 40 to be at its outward position, as shown in FIG. 5. Another operation establishing the freewheeling of the outer handle 12 involves manipulating or turning the actuating bar 46 from the inner side, i.e., by manipulating the turn button 60. When the turn button 60 is turned, the coupler 70 will turn also, and so will the actuating bar be 46 inserted in the hole 744 of the disk 74. The control member 40 then turns while axially moving from the inward position to the outward position, with the ball 44 now situated in the hole 306 and the clutch column 50 disengaged from the latch assembly 100. The clutch column 50 therefore can react to the movement of the control member 40 for engagement with or disengagement from the latch assembly 100, which enables the outer handle 12 to perform a normal operation of opening a door or to freewheel, respectively.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A clutch assembly for use in combination with a latch assembly for enabling a freewheeling movement of an outer door handle with respect to the latch assembly of a lock, the clutch assembly comprising:

a guiding sleeve for attachment to the outer door handle, the guiding sleeve having an inclined guide slot and a pair of positioning holes;

a control member rotatably and axially movably retained with respect to the guiding sleeve, the control member having a stud extending into the inclined guide slot and a depression;

a clutch column for engaging with and disengaging from the latch assembly, the clutch column being axially movable with the control member; and a ball and spring combination interposed between the depression and a selective one of the pair of positioning holes said ball and spring combination releasably retains the control member at an inward position engaging the clutch column with the latch assembly and at an outward position disengaging the clutch column from the latch assembly.

2. The clutch assembly as claimed in claim 1, wherein the control member has an actuating bar manipulatable to move the control member between the inward and outward positions.

3. The clutch assembly as claimed in claim 2, wherein the clutch column is hollow and the actuating bar extends through and is freely rotatable within the hollow clutch column.

4. The clutch assembly as claimed in claim 1, wherein the control member has an operating opening manipulatable to move the control member between the inward and outward positions.

* * * * *